June 28, 1927.  
J. J. NAUGLE  
FILTERING ELEMENT  
Filed Jan. 12, 1924
1,633,709
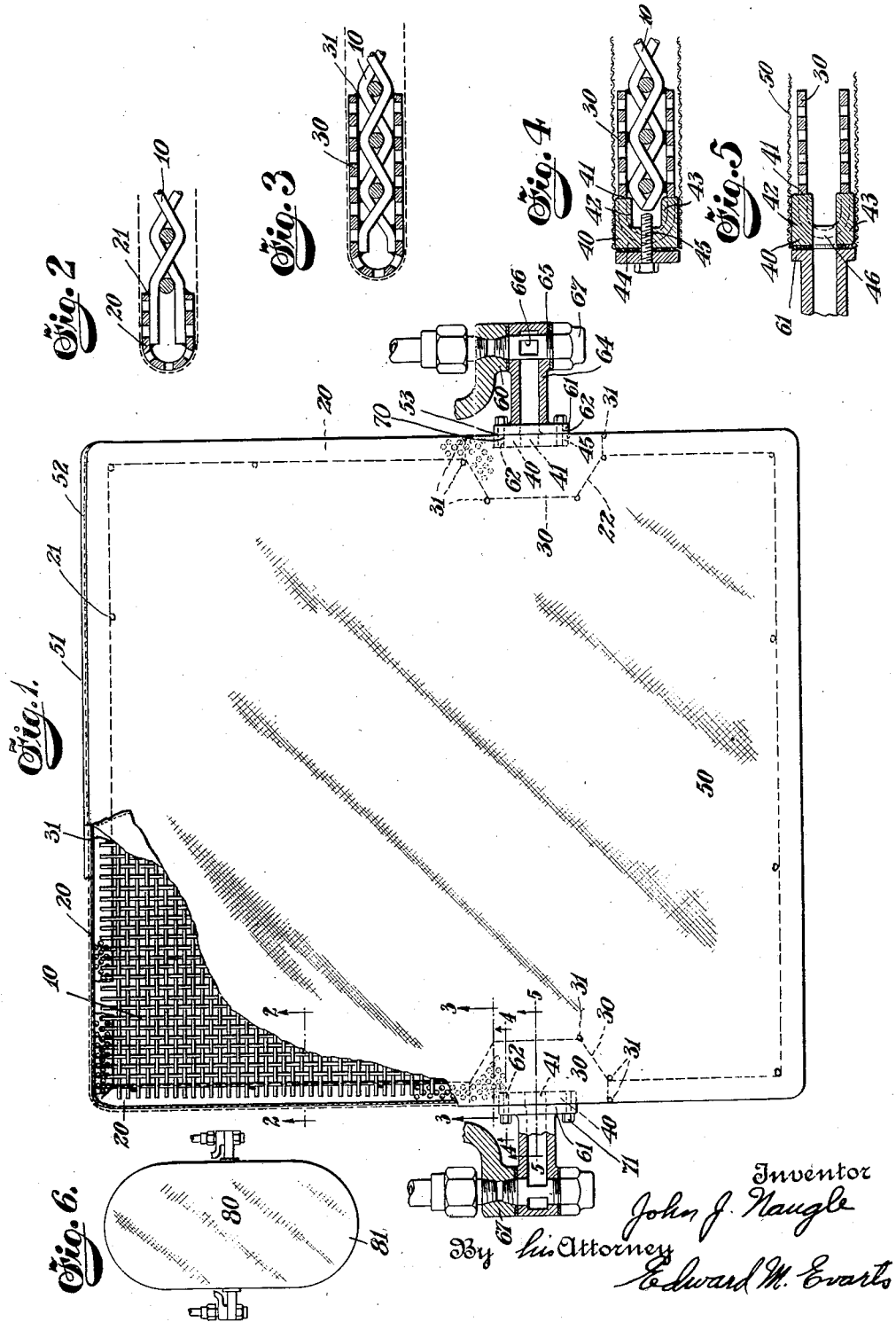

Patented June 28, 1927.

1,633,709

UNITED STATES PATENT OFFICE.

JOHN J. NAUGLE, OF BROOKLYN, NEW YORK.

FILTERING ELEMENT.

Application filed January 12, 1924. Serial No. 685,822.

My present invention relates to filtering elements, particularly, but not exclusively, such as are intended to be used in rotary filtering machines, such as the machine described and claimed in my copending application, Serial No. 685,820, filed of even date herewith. It is an object of the present invention to provide filtering elements of the general character designated above which shall be simple in construction, and easy and economical to fabricate; which shall be safe, convenient and efficient in operation; which shall have a maximum of filtering surface in proportion to the entire area of the filtering element; which may readily be assembled and installed, and as readily disassembled and removed, as when the filtering cloth or bag surrounding the metallic portions of the filtering element is torn or ruptured, and which may be shut off and disconnected from the general filtrate-discharge system in a similar contingency; and which shall have other advantages subsequently set forth in detail herein.

In the accompanying specification I shall describe and in the annexed drawing show several illustrative embodiments of the present invention. It is, however, to be clearly understood that my present invention is not limited to the specific embodiments thereof herein shown and described for purposes of illustration only.

Referring to the drawings, wherein I have shown the aforesaid illustrative embodiments of the present invention:

Fig. 1 is a plan view, partly broken away, showing a complete filtering element;

Fig. 2 is a cross-sectional view of the same taken along line 2—2 of Fig. 1;

Fig. 3 is a cross-sectional view of the same taken along line 3—3 of Fig. 1;

Fig. 4 is a cross-sectional view of the same taken along line 4—4 of Fig. 1;

Fig. 5 is a cross-sectional view of the same taken along line 5—5 of Fig. 1; and Fig. 6 is a fragmentary plan view of another embodiment of the present invention.

Referring now to the aforesaid illustrative embodiments of the present invention and more particularly to the drawing showing the same, 10 indicates a foraminous member, preferably made of metal, such as a metal screen. Since the member 10 does not constitute the filtering surface proper, but merely a support for the same, it should preferably be quite coarse, so that the meshes of the screen are warped to a considerable extent to provide proper open spacing for the filtering member itself.

Associated with the metal screen 10 is a peripheral binding member 20. The binding member 20 is preferably made of metal and is preferably U-shaped in cross-section, as shown more clearly in Fig. 2 of the drawing. In order to provide a maximum filtering surface for the filtering element of the present invention, and also that the filtering element may readily be cleansed by flowing cleaning water or other liquid through the element in a reverse direction to the direction in which the filtrate flows through such element, I prefer that the material of the binding member 20 shall be perforated, as shown more clearly in Figs. 1 and 2 of the drawing. By making the peripheral binding member 20 of perforated metal or other material, that part of the filtering member proper in contact with the peripheral binding member 20 can act efficiently as a filtering surface, and, conversely, when the filtering element as a whole is being cleansed, after a cycle of filtering operation, by the flow of water or other cleansing liquor in the reverse direction through the filtering element, the element will be cleaned not only along its central portions but even at its periphery. The advantages of this arrangement, both in the efficiency of the filtering element per square foot of total surface and in the ease and thoroughness with which the element can be cleansed after use will be at once apparent. The peripheral binding member 20 may be readily attached to the screen 10 by any suitable metal-joining means, as by spot welding at the spots indicated by reference character 21 in Fig. 1 of the drawing.

Cooperation with the screen 10 and the peripheral binding member 20 is a reenforcing fitting member, generally indicated by reference character 30. The reenforcing fitting member 30, more clearly shown in Figs. 1 and 3 of the drawing, is preferably of U-shaped cross-section, like the peripheral binding member 20, and also, like the latter member, is preferably made of perforated metal, for the reasons already suggested above. Preferably, the peripheral binding member 20 is cut away, as indicated by reference characters 22, to accommodate the reenforcing fitting member 30. The latter is now suitably rigidly attached to the screen 10 and to the peripheral binding member 20 by any suitable metal-joining process, as by spot welding at the points 31 indicated in Fig. 1 of the drawing.

Cooperating with the screen 10 and with each reenforcing fitting member 30, there being preferably two such reenforcing fitting members, is a flanged fitting member 40, more clearly shown in Figs. 1, 4 and 5 of the drawing. For this purpose the reenforcing fitting member 30 is preferably cut away, as indicated by reference characters 41, to accommodate the flanged fitting member 40, the latter having the flanged portions 42 and 43 and the transverse web portion 44. The web portion 44 is provided with the threaded openings 45, of which two are preferably provided, to accommodate the assembly bolts subsequently described, and with the central discharge opening 46. The flanged fitting member 40 is preferably rigidly connected to the screen and to the associated reenforcing fitting member 30 by brazing or any other suitable metal-joining process.

Passing over the screen 10, the peripheral binding member 20, the reenforcing fitting members 30, and the associated flanged fitting members 40, is the filtering member proper, generally indicated by reference character 50, and preferably consisting of a cotton cloth bag of the desired strength and fineness or coarseness of texture, depending upon the nature of the particular liquid being filtered and the desired completeness or roughness of the filtering operation. The bag 50 is preferably initially closed at three sides, the fourth side, indicated by reference character 51, being open so as to enable the bag to receive the metal screen 10 and the associated metal parts. After the metal screen 10 and the associated metal parts have been passed into the bag 50 through the open end 51, the material of the bag at the open end is folded over and sewed firmly into place by a coarse thread forming the seam 52. The portion 53 of the bag 50 overlying each of the flanged fitting members 40 is roughly perforated adjacent the threaded openings 45, intended to accommodate the assembly bolts, and the discharge opening 46. This portion 53 of the bag 50 serves as a gasket between the respective flanged fitting members 40 and the fittings now to be described.

The fitting 60, which comprises the discharge passage means for the filtrate passing through the filtering cloth 50, along the screen 10, through the perforations of the peripheral binding member 20 and the reenforcing fitting members 30, and out of the filtering element through the discharge passages 46 in the flanged fitting members 40, comprises the flanged base portion 61 provided with the apertures 62 for receiving the shanks of the bolts, and the entrance 63 for the filtrate. Forming an extension of the base plate is the tubular or pipe portion 64 which leads to the transverse tubular portion 65, the portions 64 and 65 forming a sort of T-fitting. The tubular portion 65 is provided with the annular filtrate-receiving channel or passage 66 on the interior face thereof. The remaining fitting 67 at the opposite side of the filtering element is preferably without a filtrate-receiving channel in its inner face, so that it serves merely to help to mechanically support the filtering element, but without serving as a discharge passage for filtrate. However, if desired, the fitting 67 may be constructed similarly to the fitting 60, so that filtrate may be discharged through both sides rather than merely through one side of the filtering element.

The fittings 60 and 67 are now attached to the filtering element by means of the bolts 70 which pass through the openings 62 in the flanged base portion 61 of each fitting, through the rough openings in the portions 53 of the filtering cloth intended to receive the shanks of the bolts, and into the threaded openings 45 of the flanged fitting members 40 intended to receive the lower ends of the bolts 70. The bolts are provided with heads indicated by reference character 71, thus enabling the bolts to be operated to assemble or disassemble the filtering element as a whole.

The advantages of the foregoing construction are numerous and of great practical importance. The filtering element of the present invention is very simple in construction and may readily and economically be fabricated by simple apparatus with a great economy of material, time, labor and equipment. The resulting filtering element is of a very strong and rugged construction, so that it may safely, conveniently and efficiently be handled, rotated or otherwise operated. The filtering element has a maximum of effective filtering surface in proportion to the total area of the filtering element, due, in part, to the perforations in the peripheral binding member and in the associated reenforcing fitting members.

The filtering element may be very rapidly assembled and as readily disassembled and removed should any occasion arise for the quick and speedy removal of such element. For example, in the emergency of the filtering cloth becoming worn out or accidentally or otherwise torn or ruptured, the filtering element is of such construction that it may be readily removed, together with its associated fittings, so that a new and perfect element may be very quickly installed. The filtering element may also be very readily shut off or disconnected from the usual filtrate discharge system in a similar contingency. Since each filtering element has its individual discharge fitting or fittings, it may be readily cleansed by the flow of cleansing water or other liquor in a reverse direction through the filtering element, that is, into the interior of the element and outwardly through the filtering cloth. This causes the cloth to expand and thus to throw off the adherent deposit. This cleansing action is facilitated and rendered all the more complete by reason of the perforations in the peripheral binding member and in the reenforcing fitting members, the construction and arrangement of which enables the cleansing fluid to be discharged even at the edges of the filtering element and thus to remove final traces of the deposit from those portions of the filtering element which are, in the ordinary construction of the filtering element, the hardest to clean, namely, the edges and peripheral portions of the filtering element.

In Fig. 6 of the drawing I have shown a slight modification of the filtering element in which the filtering element is extended so as to have two segmental circular portions at the edges included between the edges carrying the fittings for the filtering element. Such a filtering element, generally designated by reference character 80, has the segmental circular portions 81, but is otherwise constructed exactly in the manner of the filtering element already described. This filtering element has the advantage that by its use an increase of about twenty per cent (20%) in filtering surface is obtained without sacrificing any of the advantages in construction and operation of the filtering element previously described. It is to be understood that the term "perforated" wherever appearing in the specification and claims is intended to include also foraminous or pervious members and materials made otherwise than by perforating the materials of which such members are made or of which such materials consist.

What I claim as my invention is:

1. A filtering element comprising a metal screen provided with an edge binding of U-shaped cross-section and consisting of perforated metal.

2. A filtering element comprising a sheet of foraminous material provided with a peripheral binding of U-shaped cross-section and consisting of perforated metal.

3. A filtering element comprising a sheet of foraminous metal provided with a peripheral binding of U-shaped cross-section and consisting of perforated metal.

4. A filtering element comprising a metal screen, a peripheral binding of metal for said screen welded thereto, and reenforcing fitting members also of metal and likewise welded to said screen.

5. A filtering element comprising a metal screen, a peripheral binding of perforated metal for said screen welded thereto, and reenforcing fitting members also of perforated metal and likewise welded to said screen.

6. A filtering element comprising a metal screen, a peripheral binding of U-shaped cross-section and consisting of perforated metal for said screen welded thereto, and reenforcing fitting members also of U-shaped cross section and consisting of perforated metal and likewise welded to said screen.

7. A filtering element comprising a metal screen, a peripheral binding of U-shaped cross-section and consisting of perforated metal for said screen welded thereto, and reenforcing fitting members also of U-shaped cross-section and consisting of perforated metal and likewise welded to said screen.

8. A filtering element comprising a metal screen, a peripheral binding of U-shaped cross-section and consisting of perforated metal for said screen welded thereto, and reenforcing fitting members also of U-shaped cross section and consisting of perforated metal and likewise welded to said screen, and a flanged fitting member having the flanged portions thereof fitting over each of said reenforcing fitting members.

9. A filtering element comprising a metal screen, a peripheral binding of perforated metal for said screen welded thereto, and reenforcing fitting members also of metal and likewise welded to said screen, and a flanged fitting member having the flanged portions thereof fitting over each of said reenforcing fitting members.

10. A filtering element comprising a metal screen, a peripheral binding of U-shaped cross-section and consisting of perforated metal for said screen welded thereto, and reenforcing fitting members also of U-shaped cross-section and consisting of perforated metal and likewise welded to said screen, and a flanged fitting member having the flanged portions thereof fitting over each of said reenforcing fitting members.

11. A filtering element comprising a metal screen, a peripheral binding of metal for said screen welded thereto, and reenforcing fitting members also of metal and likewise welded to said screen, and a flanged fitting member having the flanged portions thereof fitting over each of said reenforcing fitting members.

12. A filtering element comprising a metal screen, a peripheral binding of U-shaped cross-section and consisting of perforated metal for said screen welded thereto, and reenforcing fitting members also of U-shaped cross-section and consisting of perforated metal and likewise welded to said screen, and a flanged fitting member having the flanged portions thereof fitting over each of said reenforcing fitting members and being securely attached thereto, said peripheral binding member being cut away adjacent said reenforcing fitting members to accommodate said reenforcing fitting members and said reenforcing fitting members being cut away adjacent said flanged fitting members to accommodate said flanged fitting members.

13. A filtering element comprising a metal screen, a peripheral binding of U-shaped cross-section and consisting of perforated metal for said screen welded thereto, and reenforcing fitting members also of U-shaped cross-section and consisting of perforated metal and likewise welded to said screen, and a flanged fitting member having the flanged portions thereof fitting over each of said reenforcing fitting members and being securely attached thereto, said peripheral binding member being cut away adjacent said reenforcing fitting members to accommodate said reenforcing fitting members and said reenforcing fitting members being cut away adjacent said flanged fitting members to accommodate said flanged fitting members.

14. A filtering element comprising a metal screen, a peripheral binding of metal for said screen welded thereto, and reenforcing fitting members also of metal and likewise welded to said screen, and a flanged fitting member having the flanged portions thereof fitting over each of said reenforcing fitting members and being securely attached thereto, said peripheral binding member being cut away adjacent said reenforcing fitting members to accommodate said reenforcing fitting members and said reenforcing fitting members being cut away adjacent said flanged fitting members to accommodate said flanged fitting members.

15. A filtering element comprising a metal screen, a peripheral binding of perforated metal for said screen welded thereto, and reenforcing fitting members also of metal and likewise welded to said screen, and a flanged fitting member having the flanged portions thereof fitting over each of said reenforcing fitting members and being securely attached thereto, said peripheral binding member being cut away adjacent said reenforcing fitting members to accommodate said reenforcing fitting members and said reenforcing fitting members being cut away adjacent said flanged fitting members to accommodate said flanged fitting members.

16. A filtering element comprising a metal screen, a peripheral binding of U-shaped cross-section and consisting of perforated metal for said screen welded thereto, and reenforcing fitting members also of U-shaped cross-section and consisting of perforated metal and likewise welded to said screen, and a flanged fitting member having the flanged portions thereof fitting over each of said reenforcing fitting members, in combination with a filtering cloth surrounding said screen, peripheral binding member, reenforcing fitting members and flanged fitting members, and a plurality of connection members each overlying a portion of said filtering cloth, which portion serves as a gasket, and connected with one of said flanged fitting members.

17. A filtering element comprising a metal screen, a peripheral binding of metal for said screen welded thereto, and reenforcing fitting members also of metal and likewise welded to said screen, and a flanged fitting member having the flanged portions thereof fitting over each of said reenforcing fitting members and being securely attached thereto, said peripheral binding member being cut away adjacent said reenforcing fitting members to accommodate said reenforcing fitting members and said reenforcing fitting members being cut away adjacent said flanged fitting members to accommodate said flanged fitting members, in combination with a filtering cloth surrounding said screen, peripheral binding member, reenforcing fitting members and flanged fitting members, and a plurality of connection members each overlying a portion of said filtering cloth, which portion serves as a gasket, and connected with one of said flanged fitting members.

18. A filtering element comprising a metal screen, a peripheral binding of U-shaped cross-section and consisting of perforated metal for said screen welded thereto, and reenforcing fitting members also of U-shaped cross-section and consisting of perforated metal and likewise welded to said screen, and a flanged fitting member having the flanged portions thereof fitting over each of said reenforcing fitting members and being securely attached thereto, said peripheral binding member being cut away adjacent said reenforcing fitting members to accommodate said reenforcing fitting members and said reenforcing fitting members being cut away adjacent said flanged fitting members to accommodate said flanged fitting members, in combination with a filtering cloth surrounding said screen, peripheral binding member, reenforcing fitting members and flanged fitting members, and a plurality of connection members each overlying a portion of said filtering cloth, which portion serves as a gasket, and connected with one of said flanged fitting members.

19. A filtering element comprising a metal screen, a peripheral binding of perforated metal for said screen welded thereto, and reenforcing fitting members also of metal and likewise welded to said screen, and a flanged fitting member having the flanged portions thereof fitting over each of said reenforcing fitting members and being securely attached thereto, said peripheral binding member being cut away adjacent said reenforcing fitting members to accommodate said reenforcing fitting members and said reenforcing fitting members being cut away adjacent said flanged fitting members to accommodate said flanged fitting members, in combination with a filtering cloth surrounding said screen, peripheral binding member, reenforcing fitting members and flanged fitting members, and a plurality of connection members each overlying a portion of said filtering cloth, which portion serves as a gasket, and connected with one of said flanged fitting members.

20. A filtering element comprising a metal screen, a peripheral binding of perforated metal for said screen welded thereto, and reenforcing fitting members also of metal and likewise welded to said screen, and a flanged fitting member having the flanged portions thereof fitting over each of said reenforcing fitting members, in combination with a filtering cloth surrounding said screen, peripheral binding member, reenforcing fitting members and flanged fitting members, and a plurality of connection members each overlying a portion of said filtering cloth, which portion serves as a gasket, and connected with one of said flanged fitting members.

21. A filtering element comprising a metal screen, a peripheral binding of U-shaped cross-section and consisting of perforated metal for said screen welded thereto, and reenforcing fitting members also of U-shaped cross-section and consisting of perforated metal and likewise welded to said screen, and a flanged fitting member having the flanged portions thereof fitting over each of said reenforcing fitting members, in combination with a filtering cloth surrounding said screen, peripheral binding member, reenforcing fitting members and flanged fitting members, and a plurality of connection members each overlying a portion of said filtering cloth, which portion serves as a gasket, and connected with one of said flanged fitting members.

22. A filtering element comprising a metal screen, a peripheral binding of U-shaped cross-section and consisting of perforated metal for said screen welded thereto, and reenforcing fitting members also of U-shaped cross-section and consisting of perforated metal and likewise welded to said screen, and a flanged fitting member having the flanged portions thereof fitting over each of said reenforcing fitting members and being securely attached thereto, said peripheral binding member being cut away adjacent said reenforcing fitting members to accommodate said reenforcing fitting members and said reenforcing fitting members being cut away adjacent said flanged fitting members to accommodate said flanged fitting members, in combination with a filtering cloth surrounding said screen, peripheral binding member, reenforcing fitting members and flanged fitting members, and a plurality of connection members each overlying a portion of said filtering cloth, which portion serves as a gasket, and connected with one of said flanged fitting members.

23. A filtering element comprising a metal screen, a peripheral binding of metal for said screen welded thereto, and reenforcing fitting members also of metal and likewise welded to said screen, and a flanged fitting member having the flanged portions thereof fitting over each of said reenforcing fitting members, in combination with a filtering cloth surrounding said screen, peripheral binding member, reenforcing fitting members and flanged fitting members, and a plurality of connection members each overlying a portion of said filtering cloth, which portion serves as a gasket, and connected with one of said flanged fitting members.

In testimony, whereof, I have signed my name to this specification this 23rd day of August, 1923.

JOHN J. NAUGLE.